United States Patent [19]

Soussloff

[11] 4,345,851

[45] * Aug. 24, 1982

[54] MOUNTING DEVICE

[75] Inventor: Dimitri G. Soussloff, Wyomissing, Pa.

[73] Assignee: Harrington Hoists, Manheim, Pa.

[*] Notice: The portion of the term of this patent subsequent to May 13, 1997, has been disclaimed.

[21] Appl. No.: 179,286

[22] PCT Filed: Jul. 10, 1979

[86] PCT No.: PCT/US79/00480

§ 371 Date: Mar. 10, 1980

§ 102(e) Date: Feb. 15, 1980

[87] PCT Pub. No.: WO80/00179

PCT Pub. Date: Feb. 7, 1980

Related U.S. Application Data

[63] Continuation-in-part of Ser. No. 923,056, Jul. 10, 1978.

[51] Int. Cl.³ ............................................. F16B 2/14
[52] U.S. Cl. .................................... 403/369; 242/72.1
[58] Field of Search ............... 403/369, 370, 371; 242/72.1; 279/42, 47, 48, 52, 56, 2 R; 411/903

[56] References Cited

U.S. PATENT DOCUMENTS

| 738,445 | 9/1903 | Hoffmann | 403/371 X |
|---|---|---|---|
| 967,334 | 8/1910 | Curry et al. | 242/72.1 |
| 1,024,344 | 4/1912 | Langevin | 403/370 |
| 1,488,001 | 3/1924 | Clare | 279/56 X |
| 1,739,740 | 12/1929 | Stoeltzlen | 403/370 X |
| 2,151,831 | 3/1939 | Buccicone | |
| 2,400,354 | 5/1946 | Jensen | 279/43 X |
| 2,515,303 | 7/1950 | Isnard | |
| 3,416,492 | 12/1968 | Greenleaf | 411/903 X |
| 3,501,183 | 3/1970 | Stratienko | |
| 3,614,140 | 10/1971 | Nestor | 403/369 |
| 3,894,743 | 7/1975 | Hiroumi | 279/1 ME X |
| 4,079,896 | 3/1978 | Plach | 242/68.2 X |
| 4,202,644 | 5/1980 | Soussloff | 403/369 |

FOREIGN PATENT DOCUMENTS

| 2726593 | of 1977 | Fed. Rep. of Germany | |
| 2171479 | of 1973 | France | |
| 45618 | 9/1919 | Sweden | 403/371 |
| 1369236 | 10/1974 | United Kingdom | 403/369 |

Primary Examiner—Andrew V. Kundrat
Attorney, Agent, or Firm—Dann, Dorfman, Herrell and Skillman

[57] ABSTRACT

A mounting device (21,22,23) for anchoring a machine element (11) coaxially on a rotarty shaft (12). The device fits between the machine element and the shaft and is effective to position the element at any desired position longitudinally of the shaft and at any angular position circumferentially of the shaft. The device has similarly tapered inner (21) and outer (22) segmented sleeves, so that relative axial displacement of the sleeves effects radial expansion and contraction of the combined elements. At one end (29) the inner sleeve cooperates with a nut (23) to effect the axial displacement of the sleeves. The outer sleeve has separate segments (36) coupled with said nut to permit limited pivotal movement of the segments. In another embodiment (FIG. 6), the sleeves (121,122) are constructed to avoid relative rotation between the sleeves by a locking portion (146). In a third embodiment (FIG. 9), the inner sleeve (221) also has separable segments (226) and a tubular element (260) which are interconnected similarly to the interlocking of the outer sleeve segments with the nut. Improved performance is provided (FIG. 10) by providing anti-friction bearing elements (350) between the nut (323) and the outer sleeve (321) and anti-friction screw threads (338) between the nut (323) and the inner anti-friction coating (450) may be applied to the nut (425).

7 Claims, 11 Drawing Figures

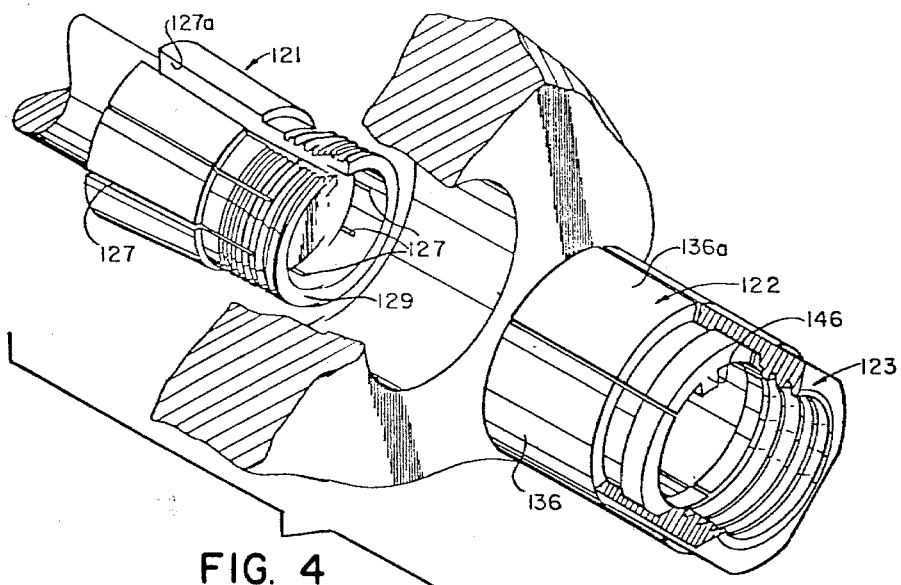
FIG. 4
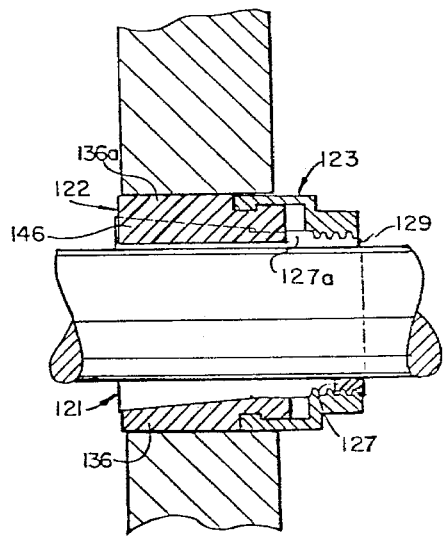
FIG. 6
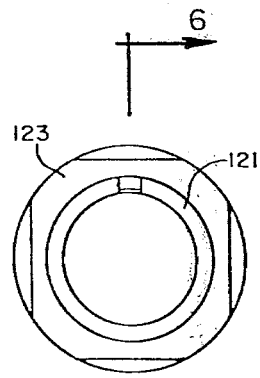
FIG. 5
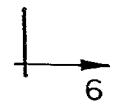

MOUNTING DEVICE

RELATED APPLICATION

This is a continuation-in-part of my U.S. patent application Ser. No. 923,056 filed July 10, 1978.

FIELD OF THE INVENTION

The present invention relates to a mounting device for mounting a machine element upon a shaft in such a manner that the rotation of the shaft transmits its entire torque to the machine element without slippage due to the mounting. In particular, the device of the present invention provides an improved mounting element which avoids the need for keys or other machining of the shaft or the machine element to effect the mounting, thereby permitting infinitely-variable adjustment of the machine element on the shaft, both axially of the shaft and circumferentially thereof.

BACKGROUND OF THE INVENTION

At the present time, where a transfer of a high torque is necessary between the shaft and the machine element mounted thereon, the standard practice is to provide a keyway in the shaft and on the confronting cylindrical surface of the machine element. The keyways are registered and the shaft and element are interlocked by the insertion of a key in the keyways to span between the shaft and the machine element to mount the element on the shaft against relative rotation. The key is anchored in the hub of the machine element by a radially-disposed set screw. The form of mounting may permit limited axial adjustment of the element on the shaft but forecloses any circumferential adjustment since the positions of the keyways in the shaft and the machine element determine the circumferential position of the element on the shaft. Apart from the limited axial adjustment provided by the conventional keyed connection between the element and the shaft, the machining operations necessary to provide the keyways constitute a substantial cost factor in the production of the elements. Furthermore, during operation of such a connection over a period of time while power is transmitted, often there occurs fretting corrosion between the keys and keyways and between the set screw and its receiver, which makes it difficult to disassemble the connection when necessary, and eventually limits the torque transmitted.

Other means of fastening machine elements to shafts have been used such as splines, flats, set screws, etc. All have the same basic disadvantages: costly machining, lack of adjustment, fretting corrosion, and difficulty in assembly and disassembly.

Recognizing these difficulties, mounting elements hae been made available commercially which permit the mounting of machine elements on shafts without the use of keys and keyways. In one such device, four separate elements are mounted on the shaft and these elements are deformed by machine screws positioned in spaced relation circumferentially about the shaft to effectively clamp the unit onto the shaft and onto the machine element by frictional engagement. In such units, the effectiveness of the device depends upon uniform application of the torque about the entire circumference of the shaft and it is therefore necessary to tighten the screws equally around the entire circumference of the shaft and this requires step-by-step tightening of the screws to avoid distortion caused by unbalanced tightening. Inasmuch as this unit depends upon deformation of the metallic elements to frictionally engage the shaft, the tightening operation generates large stresses which, in turn, require substantial tightening force. A further drawback of this type of unit is the difficulty in loosening the unit when it is desired to remove the machine element or to make an adjustment thereof. In one conventional unit of this type, all of the tightening screws must be released gradually in a predetermined order to permit the stress upon metallic elements to be relieved and then additional breaking-away screws are incorporated so that the screws may be tightened to forcefully disengage the unit from the shaft.

To avoid the use of screws to deform the members, other commercial units have provided overlapping tapered elements which are concentric with the shaft and may be axially displaced relative to one another so that the axial displacement of the tapered surfaces causes the inner and outer elements to expand radially as they slide upon each other to thereby frictionally interlock the bore of the machine element with the outside surface of the shaft. In one of such devices, the confronting tapered surfaces are specially treated to provide a low coefficient of friction between them. By forcing the two tapered elements together axial pressure is exerted on the tapered members, the frictional difference causing the unit to frictionally grip both the shaft and the machine element, respectfully, without undue slippage. To prevent circumferential slippage between the two tapered elements, a key is provided between the members. While the difference is coefficients of friction embodied in the unit purports to facilitate breaking away of the components to release the mounting, in practice breakaway screws are used to separate the tapered elements and permit release of the frictional engagement of the unit with the shaft and the machine element.

Most commercial units are fabricated in several pieces which must be assembled when put into use and which fall apart when the mounting unit is released to separate the machine element from the shaft. The separation of the component parts of the unit enables loss of individual components.

Furthermore, in most cases, the shaft or the machine element, or both, must be machined to accommodate fasteners or other retainers to retain the mounting unit in place.

SUMMARY OF THE INVENTION

With the foregoing in mind, the present invention provides a unit for keyless mounting of a machine element on the shaft which avoids the use of a plurality of individual machine screws which must be separately tightened, which is composed of individual components which are coupled together in such a fashion that they remain coupled both prior to assembly of the unit with the shaft and machine element and also remain coupled together when the unit is operated to disengage the machine element from the shaft.

The present invention enables the unit to be operated to positively disengage the machine element from the shaft.

The present invention enables the unit to be operated to anchor the machine element to the shaft by simple tightening of a single nut to effect frictional engagement and also to insure disengagement by loosening the same nut which operates to positively release the frictional engagement provided by tightening the nut.

The design of the present unit is of simple construction and is relatively inexpensive to manufacture, so that the low cost of the unit renders it economically advantageous to use a separate mounting device in lieu of requiring additional machining operations on the element themselves to accomplish the same ultimate purpose.

The objectives of the invention are more fully set forth hereinafter with reference to the accompanying drawings.

DESCRIPTION OF DRAWINGS

FIG. 4 is a view similar to FIG. 1 of an alternate embodiment of the mounting device of the present invention;

FIG. 5 is a view similar to FIG. 2 of the mounting device shown in FIG. 4;

FIG. 6 is a view taken on line 6—6 of FIG. 5;

DETAILED DESCRIPTION OF THE INVENTION

Figure 1:
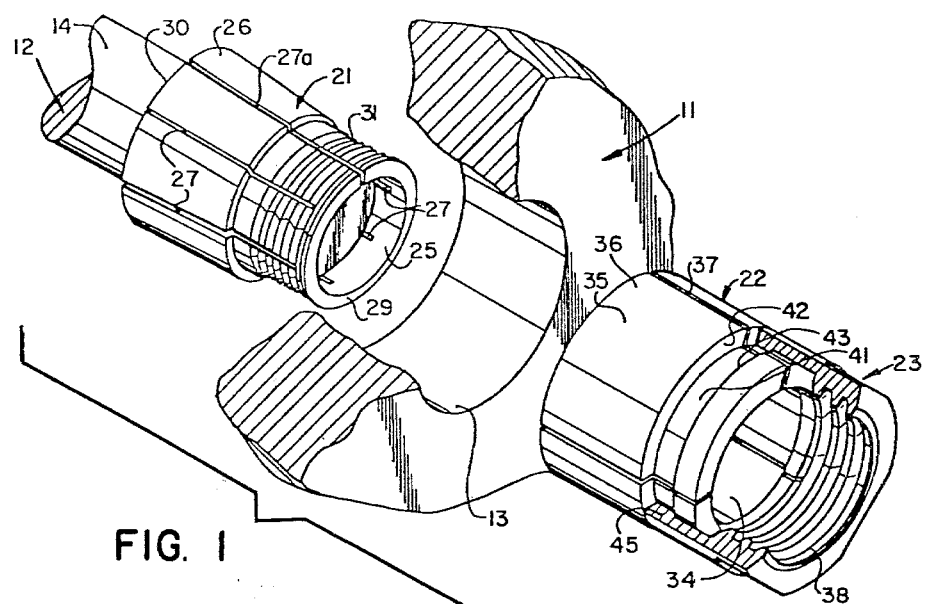
FIG. 1 is a fragmentary exploded perspective view of a mounting device in accordance with the present invention in position for coupling a machine element to a shaft.

With reference to the embodiment of the mounting device shown in FIG. 1, the mounting device is designed to mount the hub of a machine element 11 upon a cylindrical shaft 12. In the present instance, the machine element 11 has a smooth cylindrical bore 13 (see FIG. 1) whose axis coincides with the axis of the cylindrical surface 14 of the shaft 12. The mounting device is designed to be positioned between the bore 13 and the surface 14 and to be expanded therein to securely anchor the element 11 on the shaft 12 at any desired position axially of the shaft and at any angular position circumferentially of the shaft.

The mounting device incorporates an inner segmented sleeve 21, an outer segmented sleeve 22, and a locking nut 23. The inner sleeve 21 is tubular in form having an internal cylindrical bore 25 whose diameter corresponds to the diameter of the surface 14, the bore 25 being of sufficiently greater diameter than the surface 14 to permit free sliding movement of the sleeve 21 on the shaft 12 both axially and circumferentially. The sleeve 21 is formed into a plurality of segments 26 by means of slots 27 which extend axially longitudinally of the sleeve from the lefthand end 30 in FIGS. 1 and 3. All but the slot 27a terminate along a line spaced inwardly from the other end 29. The termination of the slots 27, in conjunction with the through-slot 27a, provides a split ring portion at the righthand end 29 of the sleeve 21. The axial length of the split ring at 29 is sufficient to maintain the integrity of the sleeve when the segments are deflected radially inward or outward at the opposite end 30 of the sleeve. The split ring portion avoids complex stresses and allows uniform gripping of the shaft surface by the surface 25 of sleeve segments 26. As shown, the end 29 of the sleeve 21 is externally threaded as indicated at 31, the threads extending throughout the length of the split ring portion at 29 and into the inner portions of the segments 26 formed by the terminated slots 27. The free ends of these segments 26 have tapered external surfaces.

The inner sleeve 21 is adapted to fit within the outer sleeve 22, and the outer sleeve 22 comprises three separate segments 36 formed by axial slots 37 which extend longitudinally through the entire length of the sleeve 22. In the present instance, the slots 37 are three in number to provide segments 36, each of which embraces approximately one-third of the circumference of the sleeve. The outer surfaces 35 of the three segments combine to provide a cylindrical surface having a diameter corresponding to the diameter of the bore 13 and the segments have an internal surface 34 which has a tapered configuration, the taper of which corresponds to the taper of the external surface of the segments 26. The width of the slots 37 is sufficient to permit contraction of the segments 36 to fit within the bore 13 prior to tightening engagement of the inner sleeve 21 with the outer sleeve 22. When the outer sleeve 22 is displaced on the inner sleeve 21 against the respective tapers, the tapered surfaces of the inner and outer sleeves cooperate to expand and contract respectively the external and internal cylindrical surfaces of the sleeves 22 and 21. The contraction and expansion of the surfaces is substantially perpendicular to the common central axis of the assembly. The split ring portion 29 permits the inward contraction of the segments 26 under the stress of the tapered internal surface 34 of the segments 36.

The outer sleeve 22 is displaced axially relative to the sleeve 21 by means of the nut 23. To this end, the nut 23 has internal threads 38 which threadedly engage the threads 31 of the inner sleeve 21. Rotating the nut 23 on the inner sleeve 21 axially displaces the nut relative to the inner sleeve. As shown, the threads 31 and 38 are of the truncated-tooth type known as "Acme" or jackscrew threads. A standard thread having 10 threads per inch or approximately 4 threads per cm. has a helix angle of 1.52° and a thread tooth angle of approximately 15°. A thread configuration of this character has been found fully effective to relatively displace the sleeves by means of the nut.

In accordance with the invention, the nut 23 is axially interlocked with the outer sleeve 22 so as to permit the segments 36 of the outer sleeve to slide up and down the inclined outer surface of the segments 26. Sliding up the surface locks the mounting device both against the shaft and against the bore of the element. Sliding down the surface unlocks the mounting device. To this end, the outer sleeve 22 is provided with a circumferential groove 41 on its outer surface, the forward and rearward sidewalls 42 and 43, respectively, of the groove 41 being substantially perpendicular to the common axis of the assembly. Cooperating with the groove 41, a flange 45 having a width slightly less than the width of the groove 41 is provided on the internal surface of the nut 23, the forward and rearward surfaces of the flange 45 confront the forward and rearward surfaces 42 and 43 so as to operate as oppositely-directed drive surfaces effecting forceful axial movement of the outer sleeve 22 as the nut is threadedly displaced on the inner sleeve 21. The interlock provided by the groove 41 and the flange 45 enables the outer sleeve segments to be displaced without strain or distortion of the material composing the segments 36.

Figure 3:
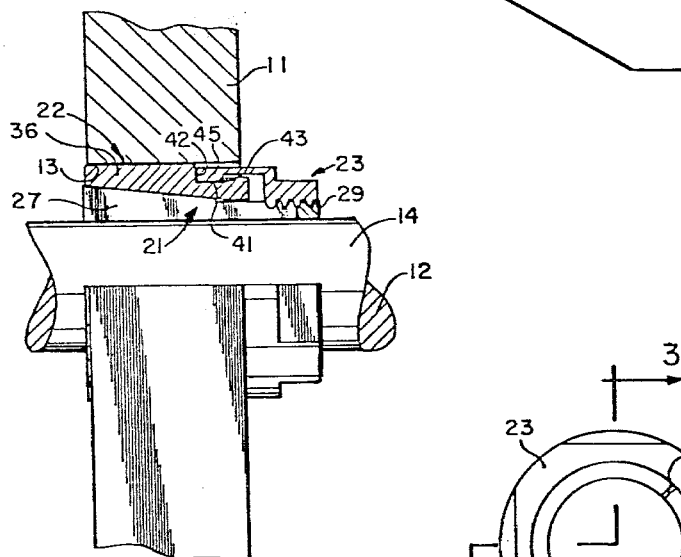
FIG. 3 is a transverse sectional view taken on the irregular section line 3—3 of FIG. 2.

In operation, it should be noted that the mounting device is forcefully engaged between the bore 13 of the element 11 on one hand and the surface 14 of the shaft 12 on the other hand by tightening the nut 23 to displace the inner and outer sleeves relative to one another upwardly against the taper of the confronting surfaces of the segments 26 and 36. This displacement tends to contract the interior bore of the sleeve 21 and to expand the exterior surface of the sleeve 22. Likewise, the unit may be forcefully disengaged from between the element 11 and the shaft 12 by reverse rotation of the nut 23 so as to forcefully displace the sleeve 22 on the sleeve 21 downwardly in the direction of the taper of the confronting surfaces thereof. This displacement permits contraction of the exterior surface of the sleeve 22 and also permits expansion of the interior bore of the sleeve 21. The forceful displacement of the outer sleeve relative to the inner sleeve is accomplished by the drive surfaces consisting of the sides of the flange 45 and the sides of the groove 41. As shown in FIG. 3, during the tightening operation the drive surfaces 42 engage and displace the sleeve 42 on the sleeve 21 and during the loosening operation, the drive surfaces 43 forcefully engage one another to displace the sleeve 22 on the sleeve 21.

If it is necessary to disassemble the unit, after disengaging the nut 23 from the inner sleeve 21, the sleeve 22 may be disengaged from interlocking relationship with the nut 23 by displacement of the individual segments 36 inwardly to disengage the groove 41 from the flange 45. However, when the nut 23 is engaged with the threads 31 of the inner sleeve 21, the inner sleeve will prevent the inward displacement of the segments 36 and the mounting unit is thereby retained in properly assembled relationship and may be handled as a unit, as it is slipped onto the shaft 12 and positioned properly to receive the machine element 11. This particular arrangement enables the mounting device to be retained in assembled condition so that it is not necessary to match up different elements in preparing the assembly for use.

The performance of the mounting unit may be defined as the ratio of the torque which the unit can transmit when installed over the torque which must be imposed on the nut to properly install the unit. The higher this ratio, the better the performance of the unit. With the truncated threads shown in this figure, and an angle of taper of approximately 3° with a steel-to-steel surface engagement providing a coefficient of friction of 0.78 between the non-lubricated interface between each sleeve and the machine element or the shaft and a coefficient of friction of 0.125 in the slightly lubricated steel interface between the respective sleeves and the nut, a theoretical performance ratio of approximately 3.5 to 4.0 is achieved. In other words, the tightening torque for the unit is one-fourth of the torque which can be transmitted by the unit.

In the aforementioned embodiment of the invention, the sleeves 21 and 22 may be rotated relative to one another inasmuch as the tapered confronting surfaces of the two sleeves provide a smooth tapered configuration. Where it is desired to avoid the relative rotation of the sleeves 21 and 22, a circumferential interlock may be provided. To this end, as shown in FIGS. 4–6, a mounting device is provided having the features of the device shown in FIG. 1 comprising an inner sleeve 121, an outer sleeve 122 and a nut 123. The inner sleeve 121 is similar to the sleeve 21 with terminated slots 127 which extend partially along the length of the sleeve 121, and a through-slot 127a which extends throughout the entire length of the sleeve 121. In the present instance, the slot 127a is substantially wider than the slots 127 so that it may receive a locking portion providing an interconnection between the sleeves 121 and 122 which prevents the relative rotation of the sleeves about their common axis. To cooperate with the slot 127a, the outer sleeve 122 has two segments 136 which are identical to the segments of the previously described embodiment plus a modified segment 136a which is provided with an inwardly projecting locking portion 146 which operates to slide in the slot 127a.

Figure 2:
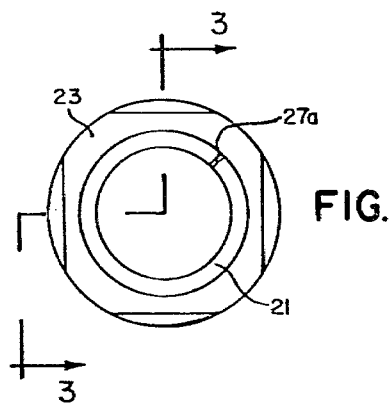
FIG. 2 is an end view of the assembled mounting device as seen from the righthand end of FIG. 1.

The circumferential interlock restricts relative rotation between the sleeves, but otherwise the mounting device of FIGS. 4–6 operates identically to the device of FIGS. 1–3.

Figure 7:
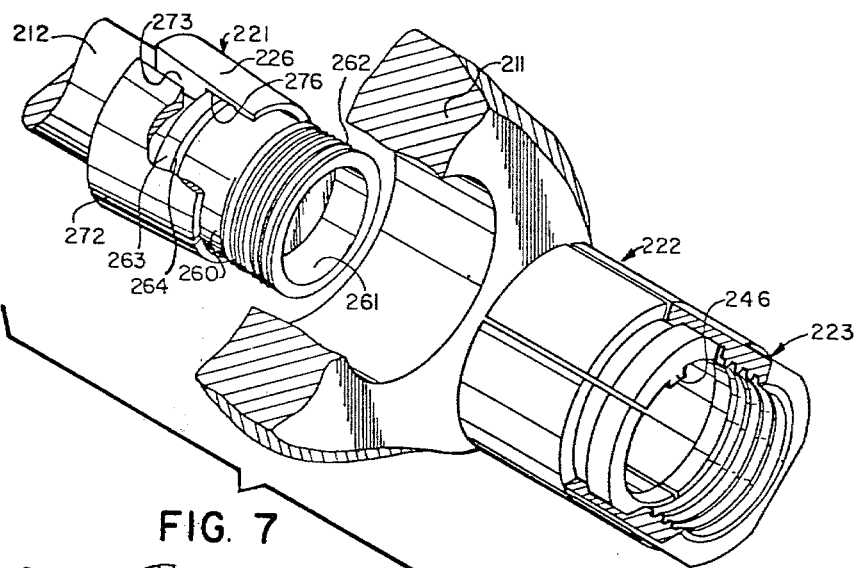
FIG. 7 is a view similar to FIG. 1 showing a further embodiment of the present invention.
Figure 9:
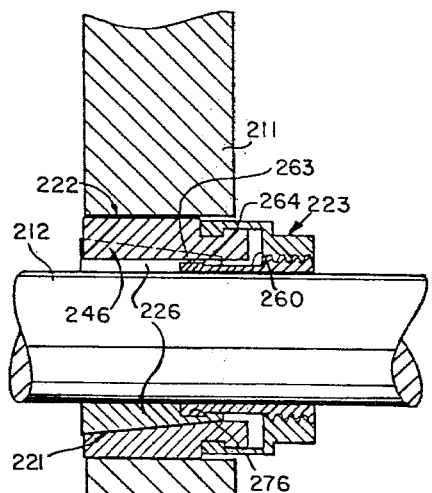
FIG. 9 is a transverse sectional view taken on line 9—9 of FIG. 8.
Figure 8:
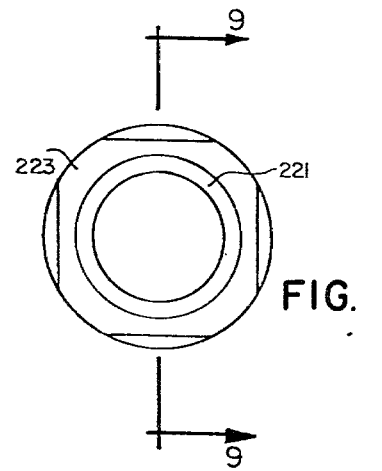
FIG. 8 is an end view of the device shown in FIG. 7.

A still further embodiment of the mounting device is shown in FIGS. 7–9. In this embodiment of the invention, the shaft is identified by the reference numeral 212 and the machine element is identified by the reference numeral 211. The inner sleeve 221 is composed of an assembly of segments 226 and a tubular element 260. The outer sleeve 222, on the other hand, is identical to the sleeve 122 of the previously-described embodiment, consisting of three separable segments, one of which has a locking portion 246 projecting inwardly therefrom. The segments 222 are interlocked with a tightening nut 223 which is identical to the nuts 23 and 123 described above.

Tubular element 260 of the sleeve 221 constitutes a continuous cylindrical element having an internal diameter preferably slightly greater than the internal diameter of the segments 226 so as to be easily slidable and rotatable on the shaft 212. At the righthand end 261, the tubular element is externally threaded as indicated at 262, the thread being cooperable with the thread of the nut 223. At the opposite end, an outwardly projecting rim 262 provides a rearwardly-facing shoulder 264 which is constructed to cooperate with the segments 226 to unite the segments with the tubular element to form the sleeve 221 into a unitary assembly.

The segments 226 are separated from one another by slots 272 and 273 which extend throughout the length of the segments. The slots 272 are relatively narrow, whereas the slot 273 is sufficiently wide to receive the portion 246 of the outer sleeve 222.

On the inner cylindrical surface formed by the combined segments 226, a groove 276 is formed to cooperate with the rim 263. Thus, the rim 263 is received in the groove 276 and the respective sidewalls of the rim and the groove confront one another substantially perpendicular to the common axis of the assembly and serve to interconnect the segments with the tubular element. The fit of the rim 263 in the groove 276 is sufficiently loose to permit the segments to pivot slightly without deforming and without strain so as to permit firm interlocking of these segments with the shaft when the mounting unit is tightened to cause the confronting tapered surfaces of the inner and outer sleeves to be displaced upwardly against the respective tapers thereof.

This latter embodiment of the invention is particularly adapted for assemblies in which it is desired to avoid even minimum strain on the material composing the sleeve. By reason of the separable nature of the components, they may be adjusted in clamping engagement without deforming or distorting the material composing the elements.

Figure 10:
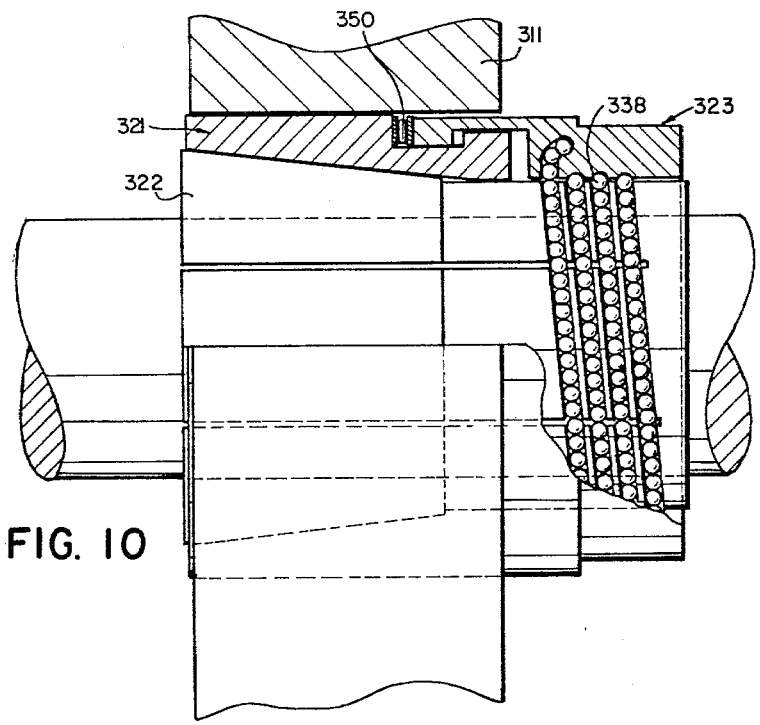
FIG. 10 is a view in side elevation with portions broken away of a fourth embodiment of the mounting device of the present invention.

A fourth embodiment is shown in FIG. 10. In this embodiment, the performance or torque ratio is substantially improved by incorporating anti-friction devices or mechanisms in the interfaces between the nut and the inner sleeve and the nut and outer sleeve respectfully. To this end, as shown in FIG. 10, the standard jackscrew thread shown at 31 and 38 in FIGS. 1–3 is replaced by a recirculating ball thread 338, commonly identified as a "ball-screw arrangement". This anti-friction mechanism minimizes the sliding friction between the nut and the inner sleeve. In addition, the interface between the forward surface 42 of the groove 41 and the confronting surface of the flange 45 in the embodiment of FIGS. 1–3, has been modified by incorporating an anti-friction element shown diagrammatically at 350 in FIG. 10. The anti-friction element 350 may comprise a thrust-bearing of standard configuration to fit within the groove provided in the sleeve 321 and/or may comprise a pressure plate having anti-friction surfaces on opposite sides thereof to minimize the friction between the flange of the nut 323 and the sleeve 321 when tightening the nut 323 on the inner sleeve 322 through the medium of the recirculating ball threads 338. Alternatively, the anti-friction element 350 may be a washer of tetrafluoroethylene ("Teflon") or other suitable anti-friction material. The minimization of friction between the nut 323 and the respective sleeves 321 and 322 substantially increases the performance ratio without need for modifying the complementary tapered surfaces of the sleeves 321 and 322.

Figure 11:
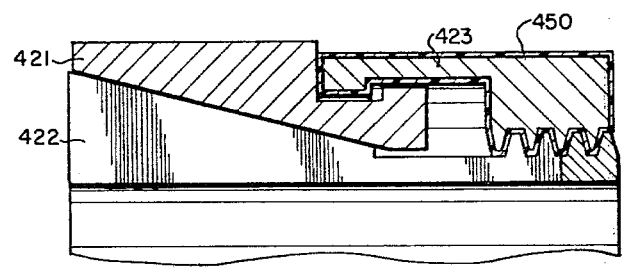
FIG. 11 is an enlarged fragmentary sectional view similar to FIG. 3 and illustrating a modification of the embodiment shown in FIGS. 1-3 inclusive.

FIG. 11 illustrates a more economical way in which to achieve a substantial increase in the performance ratio of the mounting unit. To this end, as shown in FIG. 11, the mounting unit comprises inner and outer sleeves 422 and 421 and a clamping nut 423 all having a configuration substantially identical to the similar elements of the mounting unit shown in FIGS. 1–3. The nut 423, in this embodiment, is coated with an anti-friction coating 450 by the normal coating techniques. For example, coating the nut with a tetrafluoroethylene ("Teflon") coating 450 is effective to reduce the coefficient of friction of the interfaces of the nut to approximately 0.04. By this simple expedient, the performance ratio was increased approximately threefold to an extent that the mounting unit is capable of transmitting torques theoretically 10 to 12 times the torque necessary to tighten the nut when installing the unit.

The present invention is particularly effective to avoid damage to the shaft and the machine elements in case of catastrophic overload of the machine. A major advantage of the construction of the invention is that when the applied torque exceeds the torque-transmitting limit of the unit, one of the sleeves simply slips and protects other elements without damage to the shaft or the machine element. In the event of slippage due to excess loading, the unit itself is not damaged and may be used without replacement or readjustment. The construction also enables the units to be fabricated from materials other than metal where the operating conditions are such as to limit the selection of the material used in fabricating the parts.

The use of a single nut circumscribing the shaft as the sole drive element for both tightening and releasing the mounting unit provides an efficient utilization of tightening torques, as it has been found that a tightening torque of only about 1000 inch-pounds (113 Newton-meters) on the nut is sufficient to provide a connection between a one-inch (25.4 mm) shaft and a machine element which will transmit a torque of approximately 3,000 inch-pounds (339 Newton-meters) at any practical speed. To disassemble the device, it has been found that only about 500 inch-pounds (56 Newton-meters) are necessary to disengage the mounting unit. This highly efficient torque ratio enhances the practical ability to install and remove the device.

While particular embodiments of the present invention have been herein illustrated and described, it is not intended to limit the invention to such disclosure, but changes and modifications may be made therein and thereto within the scope of the following claims.

I claim:

1. A mounting device for mounting a machine element having a cylindrical bore coaxially on a shaft having a cylindrical surface, said device comprising a segmented inner sleeve encircling the shaft, said inner sleeve comprising an integral member having a straight cylindrical interior bore corresponding in diameter to the external cylindrical surface of said shaft and having a tapered external surface, the segments of said inner sleeve providing a plurality of terminated axial slots extending longitudinally of said sleeve each extending from one end of the sleeve and terminating short of the other end, and a single axial through-slot extending from end to end of the sleeve to permit contraction and expansion of said interior bore, said device also comprising a segmented outer sleeve encircling said inner sleeve, said outer sleeve having a tapered internal surface corresponding in angle of taper to the tapered external surface of said inner sleeve and having a straight cylindrical outer surface corresponding in diameter to the cylindrical bore of said machine element, said segmented outer sleeve comprising a plurality of separate separable segments, one end of said inner sleeve having external threads, the corresponding end of said outer sleeve having circumferential interlock means providing opposed forward and rearward radial surfaces substantially perpendicular to the central axis of the shaft, a clamping nut threadedly engaged with the threaded end of said inner sleeve, said nut having cooperating circumferential interlock means defining opposing forward and rearward drive surfaces confronting the corresponding surfaces of the interlock means of said outer sleeve, whereby upon rotation of said nut in one direction, the forward surfaces of the respective interlock means engage and effect relative axial displacement of said sleeves in one direction, and upon rotation of said nut in the opposite direction, the rearward surfaces of the respective interlock means engage and effect relative axial displacement of said sleeves in the opposite direction, said displacements causing said tapered surfaces to expand and contract the interior bore and to contract and expand the exterior surface of said outer sleeve, and anti-friction means reducing the friction opposing rotation of said nut.

2. A device according to claim 1 wherein said clamping nut is encapsulated in an anti-friction coating of tetrafluoroethylene.

3. A device according to claim 1 wherein at least one of said forward surfaces of the respective interlock means has anti-friction means reducing the friction opposing rotation of the said nut in the one direction.

4. A device according to claim 3 wherein said anti-friction means comprises thrust-bearing means interposed between said forward surfaces.

5. A device according to claim 1 including anti-friction means within the threaded engagement of said clamping nut and said inner sleeve to reduce the friction opposing rotation of said nut on said sleeve.

6. A device according to claim 5 wherein said anti-friction means comprises a recirculating-ball screw thread.

7. A device according to claim 3 or claim 5 wherein said anti-friction means comprises an anti-friction coating encapsulating said clamping nut.

* * * * *

UNITED STATES PATENT AND TRADEMARK OFFICE
CERTIFICATE OF CORRECTION

PATENT NO. : 4,345,851
DATED : August 24, 1982
INVENTOR(S) : Dimitri Soussloff

It is certified that error appears in the above-identified patent and that said Letters Patent is hereby corrected as shown below:

Title page, Item (73), after " Hoists", insert -- , Inc. --
Abstract, line 2, "rotarty" should read -- rotary --;
line 24, after "inner" insert -- sleeve (322). Alternatively (Fig. 11), an --.
    Column 1, line 54, "hae" should read -- have --.
    Column 2, line 32, "is" should read -- in --.
    Column 6, line 45, "262" should read -- 263 --.

Signed and Sealed this

Twenty-first Day of December 1982

[SEAL]

Attest:

Attesting Officer

GERALD J. MOSSINGHOFF

Commissioner of Patents and Trademarks